United States Patent [19]

Oetiker

[11] Patent Number: 5,185,908
[45] Date of Patent: Feb. 16, 1993

[54] METHOD FOR CONNECTING TWO PARTS ALONG ABUTTING EDGES AND CONNECTION OBTAINED THEREBY

[75] Inventor: Hans Oetiker, Horgen, Switzerland

[73] Assignee: Hans Oetiker AG Maschinen- und Apparatefabrik, Horgen, Switzerland

[21] Appl. No.: 793,556

[22] Filed: Nov. 18, 1991

[51] Int. Cl.⁵ .............................................. B65D 63/00
[52] U.S. Cl. ................................ 24/20 R; 24/20 EE; 24/20 CW
[58] Field of Search ............. 24/20 R, 20 CW, 20 LS, 24/20 EE, 20 TT, 20 S, 20 W, 23 EE, 28, 282, 284; 219/121 LM, 121.64

[56] References Cited

U.S. PATENT DOCUMENTS

| | | | |
|---|---|---|---|
| 427,355 | 5/1890 | McLaren, Jr. | 24/20 EE |
| 2,922,212 | 1/1960 | Textrom | 24/20 CW |
| 3,824,368 | 7/1974 | Locke | 219/121 LM |
| 3,969,604 | 7/1976 | Baardsen | 219/121.64 |
| 4,391,317 | 7/1983 | Savage | 24/20 LS |
| 4,492,004 | 1/1985 | Oetiker | 24/20 R |
| 4,650,954 | 3/1987 | Frings et al. | 219/121.64 |
| 4,803,758 | 2/1989 | Calmettes | 24/20 R |
| 5,001,816 | 3/1991 | Oetiker | 24/20 R |

Primary Examiner—Victor N. Sakran
Attorney, Agent, or Firm—Paul M. Craig, Jr.

[57] ABSTRACT

In a connection of two edges of areal parts which extend at least along one common section essentially parallel to one another, at least one retaining element is arranged at the one edge which form-lockingly engages from behind, as viewed in the edge direction, in a recess in the other edge. At least one projection arranged laterally offset at the one edge in relation to the retaining element in the direction of the engagement from behind, abuts form-lockingly at the part with the recess essentially in the edge direction. To reliably secure together the parts, laser beam welding is used along the common sections of at least one of the retaining element and of the projection.

15 Claims, 2 Drawing Sheets

METHOD FOR CONNECTING TWO PARTS ALONG ABUTTING EDGES AND CONNECTION OBTAINED THEREBY

FIELD OF THE INVENTION

The present invention relates to an improved method for securely joining two parts which extend at least essentially parallel to one another along a common section of the type disclosed in my prior U.S. Pat. No. 5,001,816, and more particularly for securely joining the mutually facing edges of a clamping or compression ring as well as to the product made with such method.

BACKGROUND OF THE INVENTION

As described in my aforementioned U.S. patent, to clamp fast tubularly shaped elements along a corresponding peripheral area of a cylindrical part such as, for example, of a shaft or of a further tubular member, so-called clamping rings have been used heretofore.

However, the use of clamping rings with so-called "Oetiker" ears, which have proved commercially very successful, is not suited under certain conditions, especially, for example, when space conditions do not permit any projecting parts.

In those cases, so-called clamping or compression rings have been used, which, for clamping purposes, are either externally shrunk or pressed together over the connection or which press the two tubularly shaped members against one another by expansion of the cylindrical part.

Such clamps or compression rings are manufactured by sawing-off, punching-off or cutting-off ring-like segments from pipes having the required diameter. However, this type of manufacture has proved disadvantageous, and more particularly because (a) the newly made pipes have to be deburred which requires a further operating step, (b) only stainless steel materials can be used, but no galvanized parts, because the rings are damaged, i.e., the galvanization is missing along the sawed-off, punched-off or cut-off edges and because (c) only one ring size can be made with one pipe diameter.

The drawbacks in bending up so-called washers or manufacturing a ring from a corresponding band-like part which had been cut-off from an endless band have also been discussed in my aforementioned U.S. patent. To obviate these drawbacks, my aforementioned U.S. patent disclosed an arrangement for connecting mutually facing terminal band edges for the manufacture of a ring as well as an arrangement for the connection of two edges, generally speaking, which can be stressed in particular in tension and compression. For that purpose, my aforementioned U.S. patent proposed at least one retaining element at one edge which form-lockingly engages from behind, as viewed in the edge direction, in a recess provided in the other edge, and at least one projection at the one edge laterally offset with respect to the element, which abuts form-lockingly essentially in the edge direction at the part with the recess.

In order to securely fix the connections described in my aforementioned U.S. patent, it was proposed that the connections include at least one additional mutual interlocking obtained by punching, rivet-like cold deformation and/or spot-welding along common sections of the edges. However, spot-welding as also brazing or soldering were not recommended in my aforementioned U.S. patent for any materials other than stainless steel. This was based on the realization that except for stainless steel, spot-welding is not feasible in practice with materials such as galvanized materials or materials coated in some other manner.

The additional securing or interlocking of the connection of two edges involves in each case several segments so that also several spot-welded joints must be provided to assure a reliable interlock insofar as this cannot be achieved by punching or cold material displacement. This, in turn, means in practice that several spot-welded points must be provided.

To achieve a completely satisfactory spot-welded connection extending through the band material, the individual spot-welded points utilizing conventional resistance spot-welding must have a certain size in diameter. The narrower the clamping band, the more difficult is the accommodation of the spot-welded points having the necessary diametric dimension.

SUMMARY OF THE INVENTION

It has now been found surprisingly that all of the aforementioned drawbacks and limitations can be eliminated in an extraordinarily simple manner by utilizing conventional laser beam welding.

Welding by means of a laser beam offers the following advantages:

Any base material can be used and subjected to laser beam welding, i.e., stainless steel as also coated band materials, such as galvanized steel.

The spots obtained by laser beam welding are extraordinarily small in diameter.

The laser beam welding will extend through the thickness of the band material even though the welding spots are small.

Owing to the small diametric dimensions of the areas obtained by laser beam welding, practically every band width, for example, starting with about 5 mm. or even narrower, can be subjected to this method.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein.

DETAILED DESCRIPTION OF THE DRAWINGS

Figure 1:
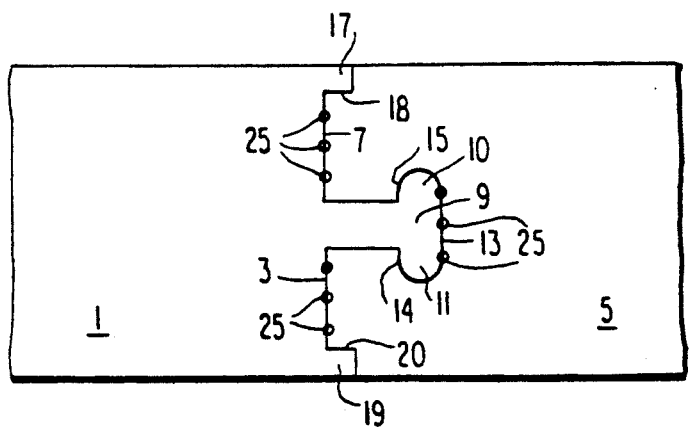
FIG. 1 is a partial plan view on a first embodiment of an arrangement for the connection of two areal parts in accordance with the present invention.
Figure 2:
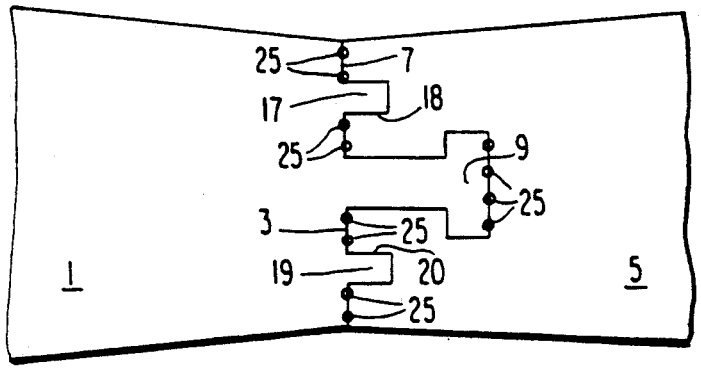
FIG. 2 is a partial plan view on a modified embodiment of a connection in accordance with the present invention.
Figure 3:
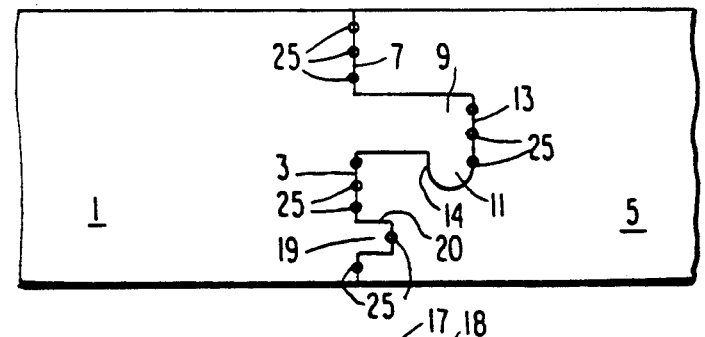
FIG. 3 is a partial plan view on a still further modified embodiment of a connection in accordance with the present invention.

Referring now to the drawing wherein like reference numerals are used to designate like parts in the various views, FIGS. 1 to 3 illustrate different possible modifications of a connection in accordance with the present invention. The connections are illustrated in top plan view on the areal parts, respectively, from above perpendicularly onto the terminal edges to be connected.

Plate-like parts 1 and 5 are connected with each other along their common edges 3 and 7, respectively. These plate-like parts 1 and 5 may be plates, band-like parts, relatively thin-walled rods, etc. A retaining element or retaining tongue 9 is arranged at the one edge 3 which includes two laterally projecting lug-like elements. According to FIGS. 1 and 2, the tongue 9 includes two such lugs 10 and 11 whereas in FIG. 3 only one projecting lug 11 is provided. The tongues 9 engage in corresponding congruent recesses 13 in the part 5, i.e., in a recess 13 of complementary shape. The tongue 9 thereby engages the recess 13 from behind, as viewed in the edge direction, along the two portions 14 and 15 by means of the two lugs 10 and 11.

If the connection according to FIGS. 1 and 2 is stressed in tension or compression, there exists the tendency of the areas of the areal part 5 which are arranged behind the portions 14 and 15, to move laterally away from the tongue 9, as a result of which the tongue 9 might be pulled out or pushed out of the recess 13. In order to counteract this tendency of a lateral bending-out in these two areas the two projections 17 and 19 are provided at the one edge 3. These two projections 17 and 19 abut at the portions 18 and 20 of the part 5 and thus counteract any lateral bending-out of the two areas to the rear of the portions 18 and 20, respectively, to the rear of the portions 14 and 15. Owing to this arrangement of the two projections 17 and 19, the connection of the two areal parts 1 and 5 along the edges 3 and 7 is effectively secured or fixed against tension or compression. The two projections 17 and 19 can thereby be arranged either at the end-face along the edge 3 or also between the tongue 9 and the ends of the edge 3.

In FIG. 3 the tongue 9 includes only one lug 11 which correspondingly engages the recess 13 from behind along the portion 14. In this embodiment, analogously only one projection 19 is necessary which abuts at the areal part 5 at least along the portion 20. The projection 19 again serves to counteract a lateral bending-out of the area of the part 5 to the rear of the portions 14 and 20.

Figure 4:
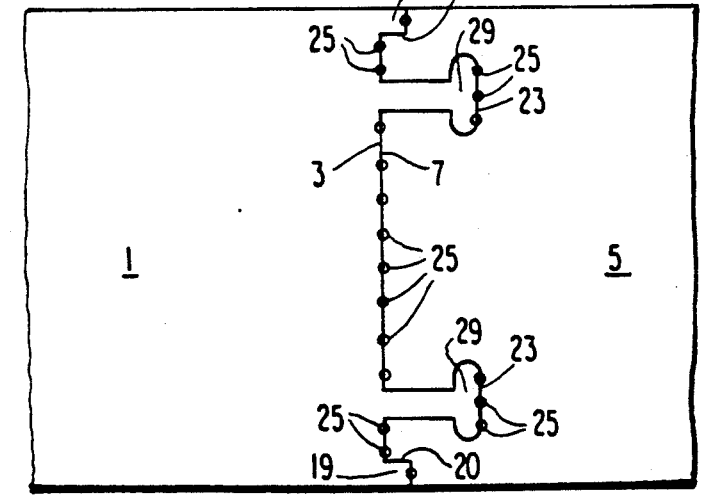
FIG. 4 is a plan view on another modified embodiment of a connection in accordance with the present invention of two large-area parts one longitudinally extending common edge.
Figure 5:
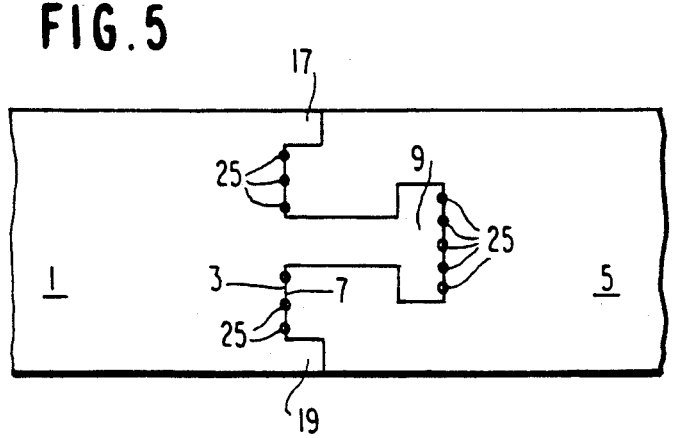
FIG. 5 is a plan view on still another embodiment of a connection in with the present invention.

FIG. 4 illustrates a connection between two parts 1 and 5 along a longitudinally extending common edge 3, 7, whereby two retaining elements or tongues 29 provided at the one edge 3 now engage in corresponding recesses 23. In the embodiment illustrated in FIG. 4 of a connection according to the present invention, no projections have to be arranged between the two adjacent tongues 29 because the tongues 29 mutually counteract against a lateral bending-out of the area of the part 5 disposed therebetween. By contrast, one projection 17 and 19 each is arranged end-face at the edge 3 which form-lockingly abuts at the portions 18, respectively, 20 of the part 5.

For reliably securing or fixing the connections described above of two parts 1 and 5, it is additionally proposed to provide a number of laser beam welded points 25 which may be located as shown in the drawing. However, it is understood that the exact number of these laser beam welded points as well as their location may be varied as known to those skilled in the art to meet the requirements of a given situation, for example, under compression or tension.

Figure 6:
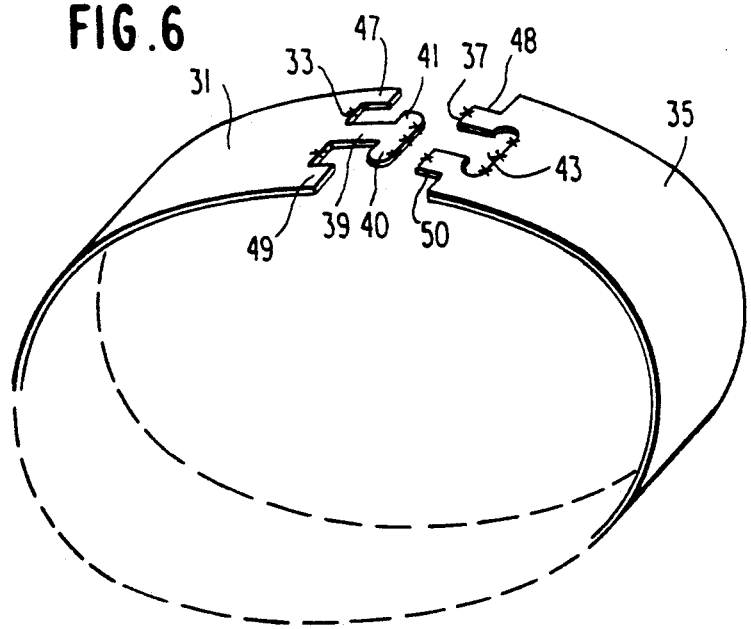
FIG. 6 a perspective view of a still further modified embodiment of a clamping ring in accordance with the present invention in the non-connected open condition.

FIG. 6 illustrates a clamping ring according to the present invention consisting of a clamping band with the two end portions 31 and 35. The clamping ring is illustrated in this figure in the open, non-connected condition. The clamping band can be made in one piece or of several parts with correspondingly one or several connections.

The two terminal edges 33 and 37 at the end portions 31 and 35 are provided with connecting elements analogous to th embodiment according to FIG. 1. A tongue 39 with lug portions 40 and 41 projecting on both sides is arranged at the edge 3. Additionally, projections 47 and 49 are provided at the edge 3. Correspondingly a recess 43 is provided at the edge 37 and portions 48 and 50 are provided along the sides, into which or at which the elements of the edge 33 are to be introduced, respectively, abutted. The places where additional fixing may be applied by laser beam welding are indicated in FIG. 6 by "x".

Depending on the desired diameter of the clamping or compression ring, a corresponding band section can be cut off from an endless band. The elements are stamped or pressed out along the edge 33 and 37 correspondingly at the two end-face portions 31 and 35 of this band-like section. The clamping ring is now realized by putting together the two edges 33 and 37 together with their correspondingly formed connecting elements by bending the band section into appropriate circular shape. For additionally fixing the connection, laser beam welding is used thereafter.

The connection of areal parts and band ends of clamps and clamping rings described herein may be modified in any suitable manner as more fully described by reference to FIG. 7 of my aforementioned patent. Additionally, the lateral portions of the retaining elements or the tongues which engage from behind the corresponding recesses, may be constructed in any suitable manner as also described in my aforementioned U.S. patent. The use and applications of the connections in accordance with the present invention are very versatile, whereby it is essential for the present invention that at least on one side of the retaining element a projection be arranged, and more particularly on the side on which the retaining element engages the corresponding recess from behind.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An arrangement for the connection of two areal parts made of weldable materials including galvanized steel along two parts thereof which extend essentially parallel to one another at least along a common section, comprising retaining means projecting from one edge of one part in the direction toward and over the edge of the other part, said retaining means being operable to form-lockingly engage from behind as viewed in the edge direction, in a recess means provided in the other part, and at least one projection means at the one part laterally offset with respect to the retaining means in the direction of the engagement with behind, which form-lockingly abuts at the other part with the recess means to constrain bending movement in the other part in the edge direction which would open the recess means in the presence of tensional forces in the two parts, characterized by laser beam welded additional fastening means along at least one common section of at least one of the retaining means and of the projection means.

2. An arrangement according to claim 1, wherein the retaining means engages the recess means from behind on both sides, as viewed in the edge direction, and wherein at least two projection means are provided, one projection means each being arranged on a respective side of the retaining means laterally offset with respect thereto.

3. An arrangement according to claim 1, wherein the retaining means engages the recess means from behind essentially in the center of the common section, and wherein the projection means is arranged essentially in the area of an end of the section.

4. An arrangement according to claim 1, wherein at least one additional fastening means is provided along the common section of the edges of at least one of the retaining means and of the projection means.

5. A clamp according to claim 1, wherein the clamping band is in one piece and the two end-face terminal edges include said connection.

6. A clamp consisting of at least one open clamping band with terminal edges arranged at its ends extending transversely to the band direction and with a connection arrangement according to claim 1.

7. A pipe clamp or compression ring with a clamp according to claim 6.

8. An arrangement for the connection of two band-like longitudinally extending parts made of steel, including galvanized steel, along terminal edges arranged essentially transversely to the band direction, with the band width of the parts being nearly equal at least within the area of the terminal edges, comprising at least one retaining means at one part and extending from the edge therefor which form-lockingly engages from behind, as viewed in the edge direction, in an essentially complementary recess means in the other part, and at least one projection means at the one edge laterally offset with respect to the retaining means in the transverse direction of the band-like parts which form-lockingly abuts in the edge direction at the part having the recess means to prevent opening of the complementary recess means in the presence of forces seeking to bend out those portions of the other part which at least partially define the recess means, characterized by laser beam fastening means along common sections of at least one of the retaining mans and of the projection means.

9. An arrangement according to claim 8, wherein the tongue-like retaining means is arranged essentially in the center of the one edge and includes lug means on both sides thereof which project essentially parallel to the edge direction, the tongue-like retaining means with its lug means form-lockingly engaging from behind an essentially congruent, also essentially centrally arranged recess means in the other edge, and wherein one projection means each laterally offset with respect to the tongue-like retaining means in the one edge is arranged at least near a respective lateral edge and, whereby each projection means form-lockingly abuts at the band-like part having the recess means essentially parallel to the edge direction and in a direction toward the recess means.

10. An arrangement for the connection of two plate-like parts made of weldable materials including galvanized steel with a longitudinally extending common section defined by the edges on the parts, comprising at least two retaining mans at one edge, one each in one-half of the common section, which form-lockingly engage from behind, as viewed in the edge direction, in corresponding recess means in the other edge, and at least one projection means each in the one edge, laterally offset in relation to each outermost retaining means in the direction toward the end of the common section which form-lockingly abut at the part having the recess means essentially in the edge direction in the direction toward the respective recess means, characterized by laser beams fastening means along common sections of at least one of the retaining means and of the projection means.

11. A method for connecting two edges of areal parts made of weldable materials including galvanized steel which extend essentially parallel to one another at least along a common section, comprising the steps of providing at least one retaining element at one edge, introducing the retaining element in a corresponding recess in the other edge so as to engage form-lockingly from behind the recess, as viewed in the edge direction, in order to prevent a pulling out of the retaining element and to hold the two parts at one another, providing at least one projection at the one edge laterally offset with respect to the retaining element in the direction of the engagement from behind which form-lockingly abuts at the part having the recess essentially in the edge direction in such a manner so as to counteract force components acting essentially in the edge direction away from the recess and resulting during tensional and/or compression loads of the connection by reason of the engagement from behind of the recess by the retaining element, and fastening together by laser beam welding the two parts at least at one place along the common section of the retaining tongue and of the projection for securely fixing the connection.

12. A method for the connection of two band-like longitudinally extending parts made of weldable materials including galvanized steel along terminal edges arranged essentially transversely to the band direction, comprising the steps of providing a retaining tongue essentially in the center of the one edge which includes one lug each on both sides thereof extending essentially parallel to the edge direction, introducing the tongue into an essentially congruent, also centrally arranged recess in the other edge so as to form-lockingly engage the same from behind, providing in the one edge on both sides of the tongue laterally offset with respect thereto one projection each which form-lockingly abuts at the band-like part having the recess essentially parallel to the edge direction and in the direction toward the recess, and fastening together by laser beam welding the two parts at least at one place along the common section of one of the retaining tongue and of the projection for securely fixing the connection.

13. A product made according to the method of claim 12 for the connection of at least one band-like part for the manufacture of a clamp-like ring.

14. An arrangement for the connection of two edges of areal parts which consist of weldable material including galvanized steel and which extend essentially parallel to one another at least along a common section, comprising retaining means at one edge which form-lockingly engages from behind, as viewed in the edge direction, in a recess means provided in the other edge, and at least one projection means at the one edge laterally offset with respect to the retaining means in the direction of the engagement from behind, which form-lockingly abuts in the edge direction at the part with the recess means, the retaining means engaging the recess means from behind on both sides, as viewed in the edge direction and at least two projection means being provided, one projection means each being arranged on a respective side of the retaining means laterally offset with respect thereto, characterized by laser beam fastening means along the common sections of at least one of the retaining means and of the projection means.

15. An arrangement according to claim 14, wherein the retaining means engages the recess means from behind essentially in the center of the common section, and wherein the projection means is arranged essentially in the area of an end of the section.

* * * * *